Sept. 20, 1955      O. E. HINTZ ET AL      2,718,109
STALK DIGGER AND CHOPPER ADJUSTING DEVICE
Filed Oct. 15, 1951      3 Sheets-Sheet 1
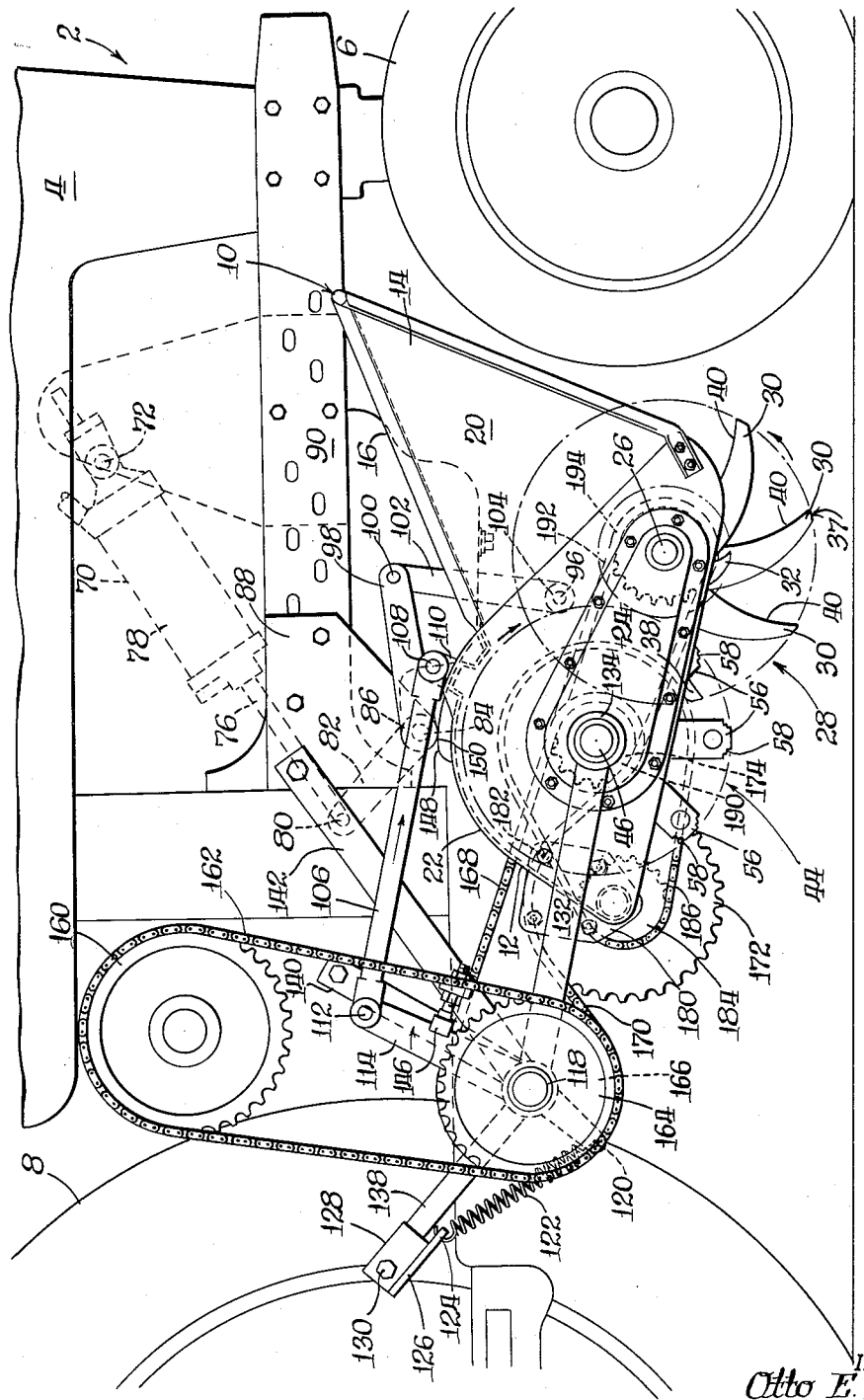
INVENTORS.
Otto E. Hintz
Arthur H. Nakata
Paul O. Pippel
Atty.

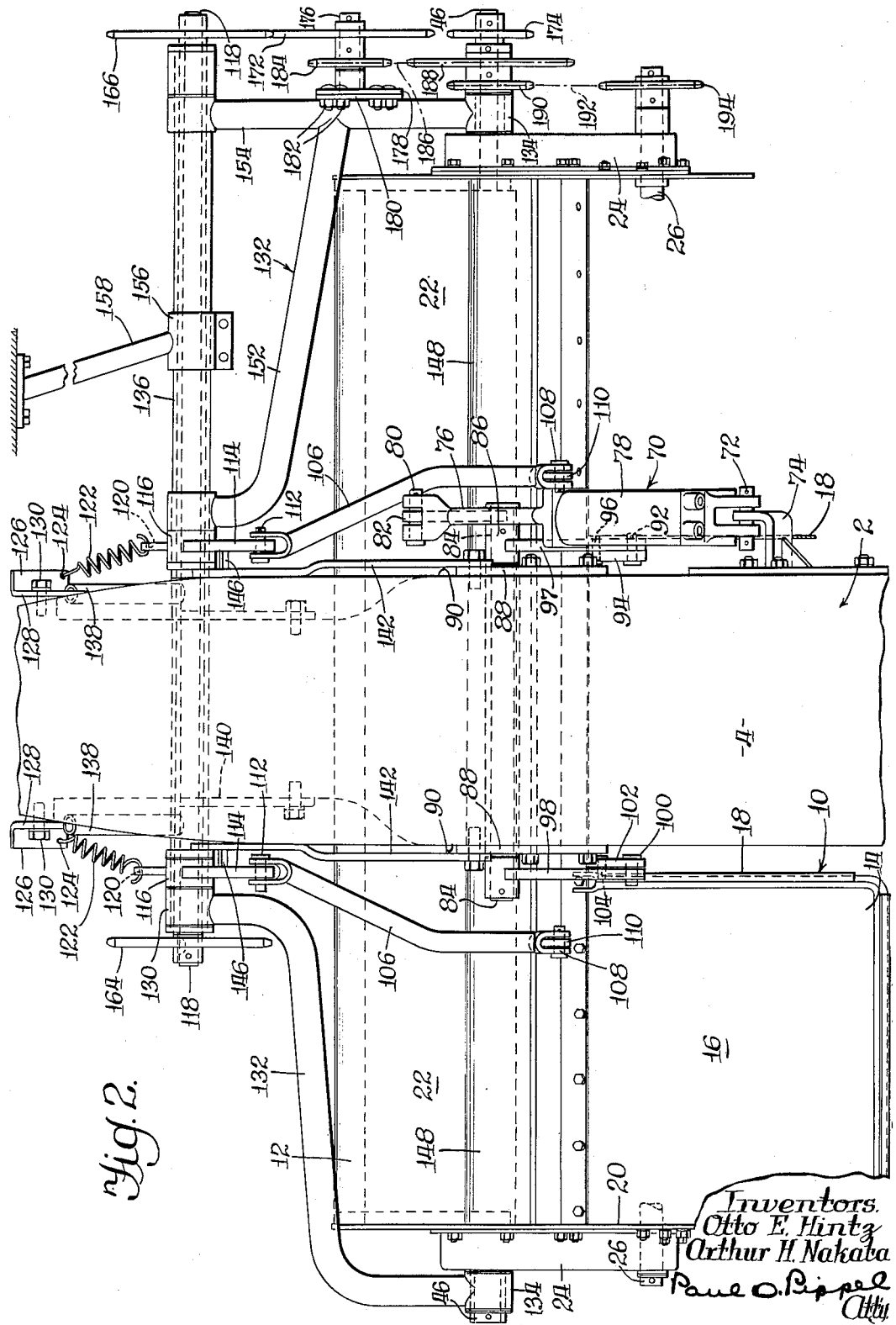

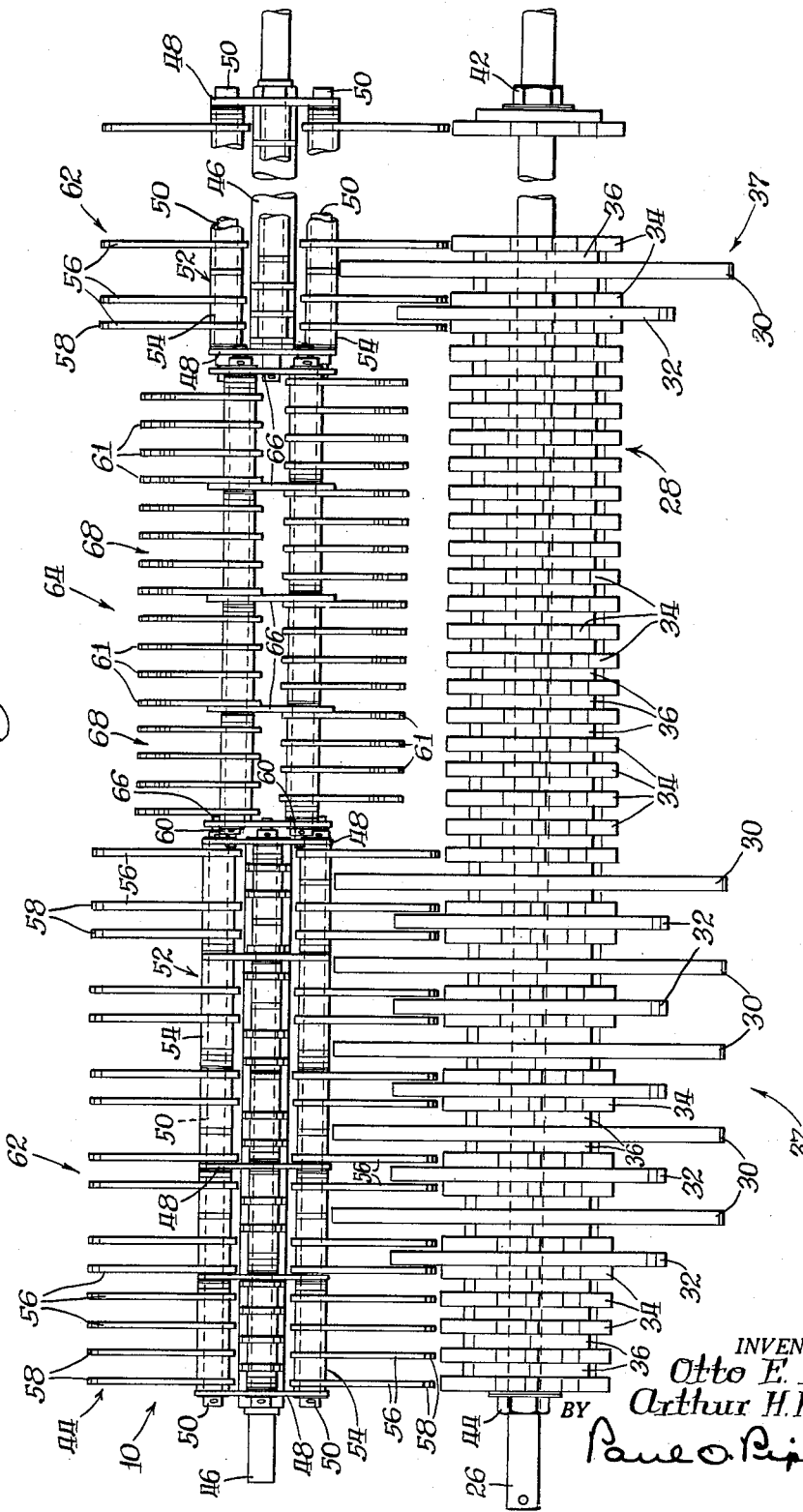

United States Patent Office 2,718,109
Patented Sept. 20, 1955

2,718,109

STALK DIGGER AND CHOPPER ADJUSTING DEVICE

Otto E. Hintz, Riverside, and Arthur H. Nakata, Chicago, Ill., assignors to International Harvester Company, a corporation of New Jersey Application October 15, 1951, Serial No. 251,336

13 Claims. (Cl. 55—118)

This invention relates to a stalk digger and chopper mechanism and more particularly to a novel unit for uprooting and comminuting cotton stalks or other bushy plants.

A general object of the invention is to provide a simple and compact unit which is adapted to be mounted beneath the waist of the conventional tractor and powered from the side power take-off thereof.

A further object of the invention is to provide a multi-row unit elongated transversely of the tractor and comprising a forward digger drum assembly and a shredder drum assembly to the rear thereof, the drums having interdigitating fingers arranged to shear the stalks therebetween.

A further object is to devise a novel suspension linkage for the unit affording substantially balanced stressed distribution.

A more specific object is to provide such unit incorporating a forward digger component cooperatively associated with a shredder component therebehind, both components being supported from an associated tractor by a novel linkage formed and arranged to lower the unit to operating position and to raise the unit to transport position, the linkage being designed to move the forward component a greater range upwardly and downwardly than the shredder component in order to effectively clear the ground when in transport position and to obtain purchase in the ground when in operating position.

The invention comprehends the positioning of a shredder drum assembly on a generally horizontal axis transversely of the line of draft of the unit and upwardly and rearwardly of the digger drum which operates on an axis parallel to the drum axis, the digger drum assembly being arranged to swing about the axis of the shredder drum for positioning in operating and transport positions.

The invention further contemplates the addition of a linkage adapted to move the unit up and down within certain ranges and to limit the uppermost movement of one component while moving the other component upwardly about the first component.

A further object is to provide a spring bias in the linkage for loading the linkage in a manner urging the unit into operating position.

These and other objects of the invention will become more apparent from the specification and the drawings wherein:

Figure 1 is a side elevational view of the unit shown applied to the tractor and in an intermediate position immediately prior to the raising of the forward component or to the lowering of the entire unit.

Figure 2 is a fragmentary top plan view with the tractor shown fragmentarily diagrammatically, and Figure 3 is a top view of the digger and shredder components disassociated from the remainder of the mechanism.

Describing the invention in detail, the tractor generally designated 2 may be of conventional design comprising a waist structure 4 carried at its forward end by a narrow steering truck 6 and at its rear end through conventional housing from a traction wheel 8 at each side thereof.

The combination digger and comminuting or shredder unit 10 is disposed beneath the waist 4 of the tractor and comprises a housing or frame structure 12 elongated transversely of the tractor and extending outwardly from opposite sides thereof and including a forwardly open shroud 14 adjacent each end thereof. Each shroud includes a top panel 16 and inboard and outboard panels 18 and 20 depending therefrom. The inboard panel may be of extremely short downward extent. The top panel 16 slopes downwardly, rearwardly and at its rear edge is suitably connected to the forward edge of a substantially semicylindrical top segment 22 of the housing. The outboard panels or elements 20 of the respective shroud sections carry suitable bearing assemblies 24 through which a cross shaft 26 is journaled, the shaft 26 forming a generally horizontal rotational axis, extending transversely of the tractor, of the forward component or stalk uprooting digger drum assembly generally designated 28.

The drum assembly or bore section 28 of the implement comprises a series of discs 30, 32, and 34 and washers 36 sleeved on the shaft 26 and stacked side by side in a manner hereinafter described. Each disc comprises a plurality of radially outwardly extending fingers 38, 38 which are curved longitudinally in a direction toward their leading edges 40. It will be seen that the discs 30, 30 are substantially larger in diameter than the discs 32, 32 which in turn are substantially larger in diameter than the discs 34, the discs 30 being adapted to function as the primary diggers and obtain the deepest penetration into the earth, the discs 32 being designed as secondary diggers, that is closer to the surface, and the discs 34 being adapted to serve as trash pickers off the surface of the ground. Of course, discs 32 may be of equal size with discs 30. The arrangement of the discs 30 to 34 on the shaft is as follows:

The discs 30 and 32 are grouped adjacent each end of the shaft to provide digger sections 37, 37 within the respective shrouds and extend across and at opposite sides of an associated row of cotton plants. It will be understood that these rows are normally planted between 38 and 40 inches apart and that each grouping extends approximately 18 inches, that is a substantial distance at each side of the associated row to account for discrepancies in the planting and the bushiness of the plant. Each group may be arranged with several discs 30 flanked by two washers 36, 36 which are disposed between discs 34, 34 at the remote sides seat against adjacent discs 32, 32. Outwardly of these groupings may be disposed a series of discs 34, 34 alternating with washers 36, 36 and a similar arrangement of alternating discs 34 and washers 36 may be located between these groups. The discs 34 may be substituted for washers 36. The entire assemblage may be compacted into a pile by nuts 42 and 44 (Fig. 3) threaded on opposite ends of the shaft and tightened against opposite ends of the stack of washers and discs. It will be seen that the discs 30 are thus positioned to dig into the soil on the rows and that the action is accentuated by the operation of the discs 32 and 34. Inasmuch as there are no plants growing intermediate the rows the discs 34 in those regions serve to cut up and lift the trash and weeds. It will be noted that the fingers of adjacent discs are angled with respect to each other to provide extensive spacing therebetween to reduce clogging and also make the action more continuous.

A shredder or comminuting drum assembly component generally indicated 44 is positioned immediately to the rear of the digger drum and rotates on an axis parallel thereto and disposed slightly upwardly and to the rear thereof. The drum structure or aft section 44 of the implement may comprise an axial tube 45 with coaxial shafts 46, 46 at opposite ends thereof, the tube 45 carrying adjacent each end a plurality of circular hub members 48, 48 keyed or connected thereto and spaced axially thereof and each having a uniformly spaced series of parallel rods 50, 50 extending therethrough, each rod supporting intermediate adjacent members 48, 48 a flay assembly 52 comprising a tube 54 sleeved on the rod and connected to one of the ends of a series of outstanding parallel flays or hammers 56, 56 disposed edgewise transversely to the axis of rotation of the shredder unit or rotor beater and formed at their outer extremities with serrated edges 58 to obtain a chopping action on a stalk engaged thereby. The flays may, of course, be individual hammers spaced by washers so that each hammer rotates freely of the others. The center section of the shredder may comprise a plurality of circumferentially spaced rods 60, 60 extending between the end members 48, 48 of the end sections, generally indicated 62, 62 of the shredder and suitably supported therefrom. The rods 60, 60 of the center section 64 of the shredder assembly may be spaced by a plurality of spacers 66, 66 sleeved thereon. Each rod 60 may carry a flay assembly 68 between each pair of spacers and between each spacer and the adjacent member 48, each flay unit 68 being generally similar to those heretofore described and comprising a tube rotatably mounted on the rod 60 and having outstanding fingers or hammers 61. The flay units 68 may comprise individual hammers separated by spacers. It will be noted that the hammers 56 disposed in the region of the digger discs 30 and 32 are arranged to interdigitate therewith in order to shear the stalks therebetween, whereas the hammers 56 and 61 disposed in the region of the outer ends of the digger drum and intermediate the digger sections 37, 37 are arranged to pass with their outer extremities in close proximity to the peripheries of the related discs 34. In this respect the arrangement provides for the most effective shearing action in the regions where it is required and strategically locates the various segments of each component so that it is most effectively utilized. It will be noted that the outer extremities of the shafts 46, 46 which form the axis in rotation for the comminuting assembly extend through journal bearing assemblies 24, 24 carried by the outward panels 20, 20 of the shrouds said panels being connected at their upper edges to the lateral edges of the semi-cylindrical or arcuate segment 22 of the housing. The unit is moved up and down by means of a hydraulic motor 70 disposed at one side of the tractor along the waist thereof, said hydraulic unit having one end pivotally connected as at 72 on a substantially horizontal axis to a suitable bracket structure 74 mounted to a side member component on the side of the tractor. The hydraulic motor or mover slopes downwardly, rearwardly from its connection at 72 and has its lower end, which is the outer end of a piston rod 76 operating within an associated cylinder 78, connected as at 80 on a generally horizontal axis to the rear end of a bell-crank lever 82 which intermediate its ends at its elbow is connected to one end of a torque rod 84 pivoted within a torque tube 86 extending transversely beneath the waist of the tractor and adjacent each end being connected to a bracket 88 suitably bolted to a side sill 90 of the tractor. The bell crank lever has a leg 97 extending forwardly from its elbow and at its forward end is pivoted on a general horizontal axis as at 92 to the upper end of a link 94 which at its lower end is pivoted on a substantially horizontal axis as at 96 to the inboard panel 18 of the adjacent left hand shroud. The other extremity of the torque rod 84 is connected to the rear end of a forwardly extending lever arm 98 which at its forward extremity is pivoted on a generally horizontal axis 100 to the upper end of a link 102 and the lower end of the link 102 being pivoted as at 104 to the inboard panel 18 of the adjacent shroud. It will be noted that the forward leg 97 of the bell crank lever as well as the lever member 98 and the links depending therefrom are arranged in parallel relationship whereby rotation of the bell crank lever in a counter-clockwise direction (Fig. 1) pursuant to the extension of the hydraulic motor, whereat the piston is moved downwardly, rearwardly, will effect upward movement of the unit with balanced action at opposite ends thereof, and conversely retraction of the hydraulic motor effects lowering of the unit.

The unit is additionally supported at each extremity thereof by means of a parallelogram linkage which is spring biased to urge the unit downwardly and additionally controls the vertical movement of the forward component of the unit with respect to the rear component as hereinafter more fully detailed. The parallelogram linkage at each side is substantially identical and comprises a top fore and aft extending link 106 pivoted on a generally horizontal axis at its forward end as at 108 to the upper end of a lug 110 which at its lower extremity is joined to the top side of the arcuate segment 22 of the housing. The rear extremity of the link is pivoted on a generally horizontal axis as at 112 to the upper end of an upright link 114, said link member 114 being provided intermediate its ends with a sleeve 116 which is rotatably mounted on a substantially horizontal axis about a cross shaft 118. The lower end of the link 114 is hooked as at 120 to the forward extremity of a tension spring 122, the spring 122 extending rearwardly of the link 114 and at its rear extremity being hooked as at 124 to an outstanding ear 126 of a bracket 128 which is mounted as by a bolt 130 to a side member of the tractor. The shaft 118 is ensleeved by a bearing 131 at the rear extremity of a bottom link 132 of the parallelogram linkage, the link 132 being bent outwardly intermediate its ends and then bent forwardly adjacent to its forward end and provided at the forward end with a sleeve 134 journaled on the outer extremity at the related end of the beater rotor shaft 46.

The shaft 118 extends through a torque tube 136 which is mounted to the tractor by means of a plurality of braces 138, 140 and 142 which at their lower ends are each connected to the tube 136 and diverge upwardly and at their upper ends are connected to a suitable member of the tractor.

Referring now to Figure 1 it will be noted that each spring 122 tends to rotate the associated link 114 in a clockwise direction as indicated by the arrow which in turn tends to move the upper link 106 forwardly whereby the housing or linking means is caused to rotate in a clockwise direction about the axis of the shafts 46, 46 of the hammer rotor. This action is terminated when the forward edge of the link 114 abuts against an adjustable stop 146 mounted on the adjacent brace 142 of the mobile support which may include the tractor as shown in Figure 1. The disposition of the stop controls the range of movement of the top link 106 which in turn determines the extent of downward movement of the digger with respect to the hammer rotor. Any further downward movement takes place with the entire unit pivoting the linkage about the axis of the hammer rotor shaft 46, the point 108 and the point 112 of the lower link about cross shaft 118. The depth of penetration of the digger unit is controlled by the extent of the retraction of the hydraulic motor. To raise the unit from operating position to transport position, the unit is raised with the digger and hammer sections moving together to the position shown in Figure 1 by operating the hydraulic motor through the linkage connected thereto. The arcuate section or element of the housing is provided on its top side with a curved abutment surface 148 concentric with the axis of the hammer rotor and adapted to abut against the underside of the torque tube 86 as at 150 (Fig. 1), these parts constituting stop means. This limits upward movement of the rear component whereby further upward action of the lever members at opposite ends of the torque rod 84 effects upward rotation of the forward component with the housing about the axis of the shafts 46, 46 of the hammer rotor. This rotation is accompanied by rearward movement of the top links 106 of each parallelogram linkage and counter-clockwise rotation of the links 114 with consequent expansion of the springs 122 which afford a yieldable connection between the fore and aft sections of the implement.

It will be noted that the parallelogram linkage at the left side of the tractor (right side as viewed in the drawings) differs slightly from that on the opposite side in that the lower link 132 on the left side is bifurcated at its rear extremity and comprises inboard and outboard legs 152 and 154 each of which journaled at their rear ends on the torque tube of the cross shaft 118, the leg 152 journaling in an area intermediate the ends of the shaft 118, and the leg 154 journaling adjacent to the left end of the shaft. This construction is necessitated due to the longer extension of the shaft 118 and the torque tube thereof from the left side of the tractor and also because of the mounting of the driving elements on the left end of the unit. The tube 136 is further braced intermediate the legs 152 and 154 by a sleeve connection 156 on the forward end of a rearwardly extending brace member 158 which at its rear extremity is suitably connected to the axle housing of the tractor.

The driving arrangement for the unit comprises a sprocket 160 which forms the output of the power take-off on the right side of the tractor, the sprocket 160 driving a chain 162 which is trained about a sprocket 164 at the right end of the shaft 118 and keyed thereto. The shaft 118 is fixed at its opposite end to a sprocket 166 which drives a chain 168 which comprises a lower run 170 extending over the upper part of an idler sprocket 172 meshing therewith and then continuing under and around a sprocket 174 keyed to the hammer rotor shaft 46 at the left end thereof. The chain 168 then returns around the sprocket 166. The idler sprocket 172 is mounted on a stub shaft 176 generally parallel to the axis of rotation of the forward and rear components and of the shaft 118, the stub shaft 176 being welded or integrally united at its inboard end to a mounting plate 178 which is clamped to a mating mounting plate 180 as by bolts 182, a plate 180 being welded to the adjacent lower parallelogram link at the junction of the legs 152 and 154 thereof where, it will be noted, that the lateral extent of the leg 152 serves efficiently to prevent buckling.

The idler sprocket 172 is formed integrally on its inboard side with a smaller sprocket 184, the sprocket 184 driving the chain 186 which is trained about a larger sprocket 188 journaled on the adjacent shaft 46, the sprocket 188 being formed on its inboard side integrally with a smaller sprocket 190 driving a chain 192 which in turn drives a larger sprocket 194 mounted on the left end of the shaft of the digger unit.

Referring now to Figure 1 it will be noted that the driving arrangement is such as to drive the digger drum in a counter-clockwise direction as shown by the arrow and the hammer rotor in a clockwise direction. The rotation of the digger unit is substantially slower than the hammer rotor. In view of this disparity in the speeds it will be readily appreciated that the hammers will shear the stalks entered between same and the interdigitating discs of the digger.

We claim:

1. In a machine unit comprising a first section and a second section having generally parallel shafts, a connecting structure extending between said shafts and journalled at spaced points thereon whereby the first and second sections are adapted to pivot about the shaft of the other, and a parallelogram linkage for controlling relative pivotal movement between the sections and comprising a pair of generally parallel links spaced transaxially of said shafts and one pivoted at one end to said structure at a point spaced from said shafts and the other at the corresponding end on the shaft of the second section, a transverse link pivoted at spaced points to the other ends of said links to complete the parallelogram, means operatively associated with and loading the linkage to effect pivoting of the first section with said element about the shaft of the second section, and means limiting said rotation abuttable with said transverse link and adjustable to vary the movement of the linkage and thus the extent of said pivotal movement of the first section under the influence of said loading means whereby establishing desired angular disposition of the first section with respect to the second.

2. The combination with a vehicle, a farm implement, a supporting framework therefor pivoted on a substantially horizontal axis from the vehicle transversely thereof, and means for lifting and lowering the implement comprising a torque tube extending transversely of the vehicle, a torque rod through the tube, a forwardly extending lever arm on each end of the rod, a swing link pivoted from each arm and to a forward part of the implement, a rearwardly extending lever arm member connected to one end of the rod, and a hydraulic motor having one end pivoted to the vehicle and the other end to the rear end of the arm member, said motor extending diagonally downwardly toward said lever arm member.

3. A farm implement comprising fore and aft sections each comprising a generally horizontal shaft, and the shafts disposed generally parallel, first rigid means extending between and pivoted at spaced points on respective shafts, a support structure, a second rigid means pivoted to the structure at one point and to the shaft of said aft section at another point, a mover connected between the fore section and support to effect vertical movement of the latter, yieldable means interconnecting said first and second rigid means and effective to hold the same in relative predetermined relationship for pivotal movement as a unit about the pivot of said structure with said second rigid means, and abuttable rotary stop means on said support structure and said aft section to limit its upward movement while said fore section swings upwardly about said shaft of said aft section under the influence of said mover against the resistance of said yieldable means.

4. A farm implement comprising first and second sections, rigid means extending therebetween and pivoted thereto, support linkage pivoted to the second section at its point of pivot to said rigid means, pivot means affording a substantially horizontal axis of rotation for said linkage at a point spaced from its pivot to said second section, means for raising and lowering said implement and connected to said first section, means for releasably holding said sections for movement as a unit about said axis, and stop means engageable with the second section to limit its movement while said first section is rotated about the first-mentioned axis.

5. In a farm machine, a supporting vehicle, a fore and aft extending support linkage alongside of the vehicle and pivoted at one point thereto on a substantially horizontal axis, a machine component pivoted to said linkage at another point forwardly of said one point, another component forwardly of the last-mentioned component, rigid means pivotally supported from said linkage at the second-mentioned point and rotatable vertically thereabout and connected to said other component, and spring means reactively disposed between said other component and said tractor and acting in a direction rotating the former downwardly about the first-mentioned component for engaging the former with the ground and thereby supporting the latter off the ground.

6. A ground-traversing farm implement having a plurality of rotary sections arranged one behind the other, rigid means extending transaxially of said sections and journalling the same at spaced points, a mobile support, means pivotally supporting the rear section at a point rearwardly thereof from the support, and biasing means connected to said forward section for rotating it downwardly against the ground about the rear section whereby said rear section is supported off the ground.

7. An implement according to claim 6 and including means for lifting both sections about the pivot of said second-mentioned means and connected to said rigid means, and abutment means on said rigid means and said support for limiting upward movement of the rear section while accommodating upward rotation of the forward section about the level of the rear section.

8. The combination with an ambulant carrier, of a support linkage for a farm implement comprising first and second cooperatively associated components, means articulatingly interconnecting said components on a generally horizontal axis, said first component adapted to operate upon the ground and the second component off the ground, said first component disposed to support said second component off the ground through said means, pivotal support means on the carrier generally parallel to said axis and spaced therefrom, rigid means pivotally connected to said first mentioned means at one point and to said pivotal support means at another point, means releaseably interlocking said components for movement as a unit, lifting and lowering means operatively connected between said first component and said carrier for lifting and lowering the implement as a unit, and cooperable means on the first-mentioned means and the carrier for limiting upward movement of said second component while accommodating upward movement of the first component about said axis.

9. In a farm implement for use with a tractor having a support intermediate its ends, a generally horizontal transverse shaft carried thereby beneath the tractor, a pair of arms having rear ends pivoted on the shaft and extending fowardly therefrom, a first implement component having a shaft extending between and journalled on the forward ends of said arms, a frame structure having a transverse element extending between said forward ends of said arms over said first implement component and having at opposite ends of the transverse element a pair of dependent portions pivoted on said shaft of said first implement component and extending forwardly therefrom, a second implement component having a shaft journalled on said portions ahead of said first component, link means pivoted on said first-mentioned shaft at one point, a fore and aft extending link pivoted at one end to said element and at the other end to said link means at a point vertically spaced from the pivot of the link means on said shaft, means operative between said link and said tractor for urging said link forwardly whereby said second component is urged groundwardly about the first.

10. A stalk digging and shredding implement of the type for attachment to a vehicle and driven by the power take-off unit thereon comprising support means adapted to be rigidly connected to said vehicle, a substantially horizontal drive shaft rotatably supported by said means transverse to the longitudinal axis of the vehicle, said shaft adapted to be rotated by said unit, a pair of frame members disposed at opposite sides of the vehicle pivotally journalled on said drive shaft and extending forwardly therefrom, a beater rotor having a shaft rotatably supported by said frame members forwardly and generally parallel to said drive shaft and driven therefrom, a frame structure pivotally mounted on said beater shaft and comprising a pair of forwardly extending side portions and an interconnecting portion extending transversely of said side portions over said beater rotor and presenting an upwardly facing curved surface concentric with the axis of said beater shaft, a digger rotor having a shaft journalled from said side portions ahead of said beater rotor and driven from the shaft thereof, means for yieldably holding said structure against pivotal movement relative to said members, means operable between said structure and said vehicle and connected to the former at a point ahead of the axis of pivot thereof for pivotable lifting and lowering said digger and beater rotor with said structure and said frame structure about the axis of said drive shaft, and a downwardly facing surface on the vehicle disposed in opposing relation to said surface on the structure for limiting upward movement of said structure while accommodating upward rotation thereof about said beater shaft for lifting said digger.

11. In combination, a mobile support, a parallelogram linkage including a pair of vertically spaced fore and aft extending link members and a pair of linking means pivotally interconnected with corresponding ends of said members, means pivotally mounting said linkage on the support on a generally horizontal axis at the pivotal connection of one of said linking means with one of said link members, first implement section journalled on said linkage at the point of pivotal connection of said one link member with the other of said linking means, a second implement section carried by said other linking means at a point spaced from said last-mentioned point of pivotal connection, and biasing means operatively associated with the other of said link members for urging the same in a direction pivoting said second implement section downwardly.

12. The invention according to claim 11, and including stop means carried on the support in the path of movement of said one linking means for abutment therewith to limit the action of said biasing means.

13. The invention according to claim 11, and including opposed abutment surfaces on said other linking means and said support concentric with the pivot of said first implement section and adapted to limit upward movement of said other linking means while accommodating rotation thereof about said last-mentioned pivot to permit lifting of the second implement section above the first.

References Cited in the file of this patent

UNITED STATES PATENTS

| | | |
|---|---|---|
| 1,186,375 | Burrows | June 6, 1916 |
| 1,462,486 | Devey | July 24, 1923 |
| 1,651,030 | Kowalsky | Nov. 29, 1927 |
| 1,682,468 | Barnes | Aug. 28, 1928 |
| 2,066,610 | Carlin | Jan. 5, 1937 |
| 2,360,955 | Lucius | Oct. 24, 1944 |
| 2,445,145 | Love | July 13, 1948 |
| 2,458,795 | Orendorff | Jan. 11, 1949 |
| 2,526,396 | Nowlin | Oct. 17, 1950 |
| 2,564,352 | Bjorklund | Aug. 14, 1951 |
| 2,569,201 | Smith | Sept. 25, 1951 |